US012690003B2

(12) United States Patent
El Hamss et al.

(10) Patent No.: US 12,690,003 B2
(45) Date of Patent: Jul. 21, 2026

(54) ENABLING POSITIONING IN UNLICENSED SPECTRUM

(71) Applicant: InterDigital Patent Holdings, Inc., Wilmington, DE (US)

(72) Inventors: Aata El Hamss, Laval (CA); Fumihiro Hasegawa, Westmount (CA); Moon-il Lee, Melville, NY (US); Faris Alfarhan, Montreal (CA); Paul Marinier, Brossard (CA); Tuong Duc Hoang, Montreal (CA); Jaya Rao, Montreal (CA); Janet A. Stern-Berkowitz, Little Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 250 days.

(21) Appl. No.: 18/294,798

(22) PCT Filed: Jul. 28, 2022

(86) PCT No.: PCT/US2022/038627
§ 371 (c)(1),
(2) Date: Feb. 2, 2024

(87) PCT Pub. No.: WO2023/014566
PCT Pub. Date: Feb. 9, 2023

(65) Prior Publication Data
US 2025/0089002 A1 Mar. 13, 2025

Related U.S. Application Data

(60) Provisional application No. 63/228,435, filed on Aug. 2, 2021.

(51) Int. Cl.
*H04W 4/38* (2018.01)
*H04L 5/00* (2006.01)
(Continued)

(52) U.S. Cl.
CPC .......... *H04W 64/00* (2013.01); *H04L 5/0048* (2013.01); *H04W 16/14* (2013.01); *H04W 24/10* (2013.01)

(58) Field of Classification Search
CPC ..... H04W 64/00; H04W 16/14; H04W 24/10; H04L 5/0048; H04L 5/0094;
(Continued)

(56) References Cited

U.S. PATENT DOCUMENTS

| | | | | |
|---|---|---|---|---|
| 11,929,951 B2 * | 3/2024 | Wu | ......................... | H04L 5/0048 |
| 2019/0327707 A1 * | 10/2019 | Agnihotri | ................. | G01S 5/10 |
| 2020/0305191 A1 * | 9/2020 | Moon | ................... | H04W 72/23 |

FOREIGN PATENT DOCUMENTS

| | | | | |
|---|---|---|---|---|
| WO | WO-2019068312 A1 * | 4/2019 | ............... | G01S 1/20 |
| WO | 2020068472 A1 | 4/2020 | | |

OTHER PUBLICATIONS

3G4G Blog, "Positioning Techniques for 5G NR in 3GPP Release-16", The 3G4G Blog, Latest News and Information on 3G, 4G, 5G Wireless and Technologies in General, Oct. 23, 2020, 12 pages.

* cited by examiner

*Primary Examiner* — Tanmay K Shah
(74) *Attorney, Agent, or Firm* — Condo Roccia Koptiw LLP

(57) ABSTRACT

Systems, methods, and instrumentalities are described herein for enabling positioning, for example, in unlicensed spectrum. A wireless transmit/receive unit (WTRU) may monitor for reference signals (e.g., positioning reference signals) in the unlicensed spectrum. The WTRU may fallback to a different positioning configuration. For example, the WTRU may fallback to monitor for reference signals in the unlicensed spectrum within a discovery reference signal window. For example, the WTRU may fallback to monitor for reference signals in a licensed spectrum. The WTRU (Continued)

may determine to fallback to a different positioning configuration, for example, based on whether reference signals are determined to be missing (e.g., consecutive missing reference signals).

16 Claims, 7 Drawing Sheets

(51) Int. Cl.
    *H04W 16/14*           (2009.01)
    *H04W 24/10*           (2009.01)
    *H04W 64/00*           (2009.01)

(58) Field of Classification Search
    CPC .... H04L 27/0006; G01S 5/011; G01S 5/0263;
                                   G01S 5/0236
    USPC ...................................................... 455/456.2
    See application file for complete search history.

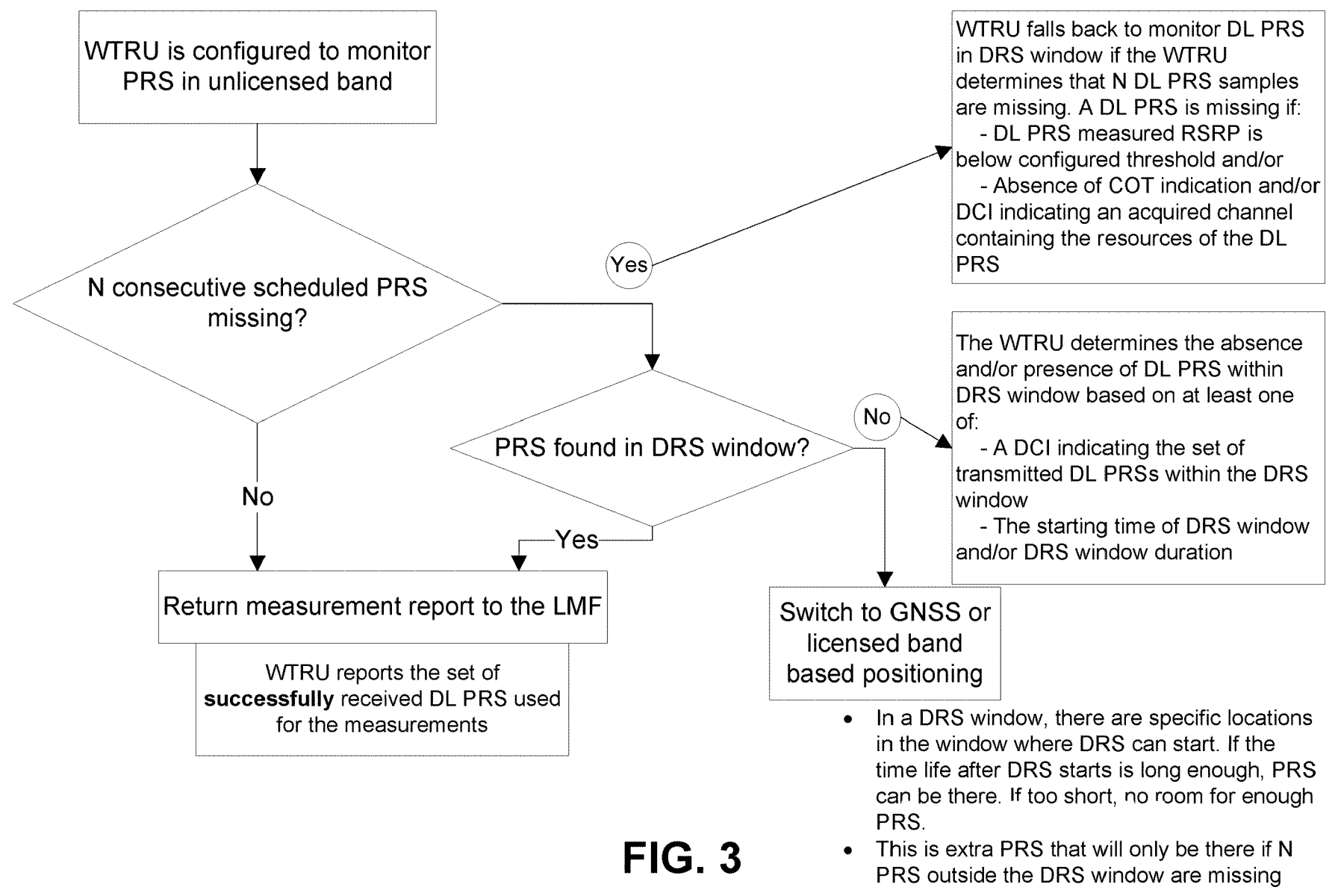

WTRU is configured to monitor PRS in unlicensed band

N consecutive scheduled PRS missing?

Yes

WTRU falls back to monitor DL PRS in DRS window if the WTRU determines that N DL PRS samples are missing. A DL PRS is missing if:
- DL PRS measured RSRP is below configured threshold and/or
- Absence of COT indication and/or DCI indicating an acquired channel containing the resources of the DL PRS PRS found in DRS window?

No

The WTRU determines the absence and/or presence of DL PRS within DRS window based on at least one of:
- A DCI indicating the set of transmitted DL PRSs within the DRS window
- The starting time of DRS window and/or DRS window duration Switch to GNSS or licensed band based positioning

- In a DRS window, there are specific locations in the window where DRS can start. If the time life after DRS starts is long enough, PRS can be there. If too short, no room for enough PRS.
- This is extra PRS that will only be there if N PRS outside the DRS window are missing No Yes Return measurement report to the LMF WTRU reports the set of successfully received DL PRS used for the measurements

FIG. 3

ENABLING POSITIONING IN UNLICENSED SPECTRUM

CROSS-REFERENCE TO RELATED APPLICATIONS

The application is the National Stage Entry under 35 U.S.C. § 371 of Patent Cooperation Treaty Application No. PCT/US2022/038627, filed Jul. 28, 2022, which claims the benefit of U.S. Provisional Application 63/228,435, filed Aug. 2, 2021, the contents of which are incorporated by reference in their entirety herein.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, and instrumentalities are described herein for enabling positioning, for example, in unlicensed spectrum. A wireless transmit/receive unit (WTRU) may monitor for reference signals (e.g., positioning reference signals) in the unlicensed spectrum. The WTRU may fallback to a different positioning configuration. For example, the WTRU may fallback to monitor for reference signals in the unlicensed spectrum within a discovery reference signal window. For example, the WTRU may fallback to monitor for reference signals in a licensed spectrum. The WTRU may determine to fallback to a different positioning configuration, for example, based on whether reference signals are determined to be missing (e.g., consecutive missing reference signals).

The WTRU may receive configuration information indicating to the WTRU to monitor for positioning reference signals (PRSs), for example, in an unlicensed band. The configuration information may indicate a first threshold (e.g., a first number), for example, associated with a number of consecutive missing PRSs. The WTRU may determine that there is a number of consecutive missing PRSs associated with the unlicensed band. The WTRU may determine that the number of consecutive missing PRSs associated with the unlicensed band is greater than or equal to the first threshold. The WTRU may (e.g., based on the determination that the number of consecutive missing PRSs associated with the unlicensed band is greater than or equal to the first threshold) may perform a first measurement associated with a first set of PRSs. The first set of PRSs may include a first PRS in a DRS window. The first PRS may be determined to be present in the DRS window. The first PRS may be determined to be present in the DRS window based on one or more of the following: first downlink control information (DCI) received in the DRS window (e.g., that indicates that the first PRS is present in the DRS window); a start time associated with the DRS window; a duration associated with the DRS window; etc. The WTRU may send a measurement report, for example, including the first measurement and/or a first indication indicating the first set of PRSs. The WTRU may receive a signal, for example, indicating the start time associated with the DRS window. The WTRU may determine the duration associated with the DRS window, for example, based on the start time associated with the DRS window (e.g., as indicated by the signal).

The WTRU may determine that a PRS (e.g., a second PRS) is missing in the unlicensed band. For example, the WTRU may determine that the PRS (e.g., second PRS) is missing in the unlicensed band based on one or more of the following: a determination that a measurement associated with the second PRS is below a second threshold; a channel occupancy time (COT) indication; a second DCI; etc.

The WTRU (e.g., operating in the unlicensed band outside a DRS window) may perform a measurement (e.g., a second measurement), for example, on a PRS (e.g., third PRS) associated with a second set of PRSs (e.g., second set of PRSs in the unlicensed band outside the DRS window). The WTRU may include in a measurement report, for example, the second measurement and/or an indication that indicates the second set of PRSs.

The WTRU may fallback to a licensed spectrum-based positioning configuration, for example, from an unlicensed spectrum-based positioning configuration (e.g., monitoring for PRS inside a DRS window). The WTRU may determine that a number of PRSs associated with the DRS window is below a threshold (e.g., third threshold). The WTRU may (e.g., based on a determination that the number of PRSs associated with the DRS window is below the third threshold) perform a measurement on a PRS associated with a licensed band. The WTRU may (e.g., based on a determination that the number of PRSs associated with the DRS window is below the third threshold) perform a measurement on a PRS associated with a global navigation satellite system spectrum.

BRIEF DESCRIPTION OF THE DRAWINGS

FIG. 3 is a diagram illustrating an example WTRU monitoring for PRS.

DETAILED DESCRIPTION

Figure 1A:
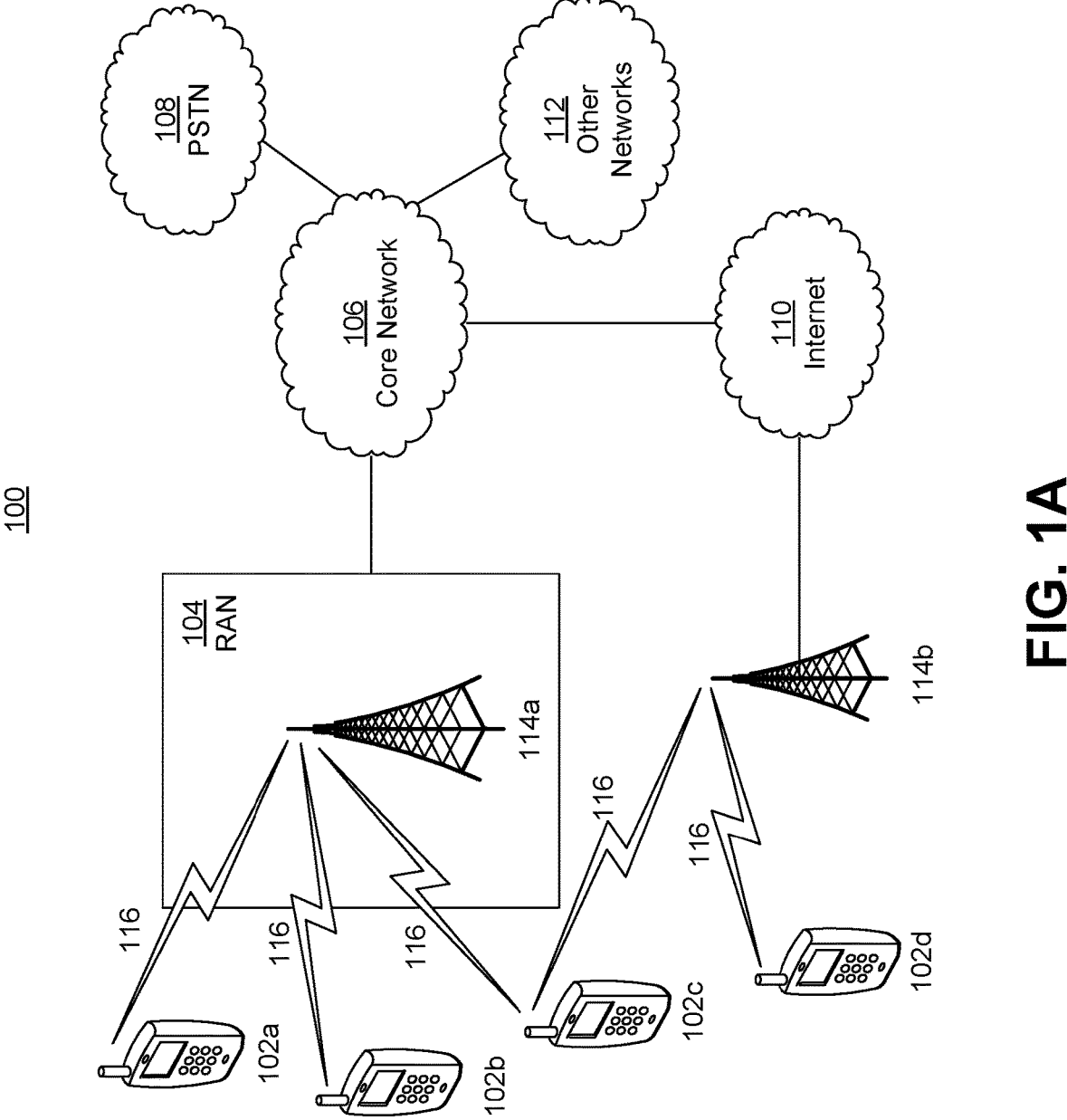
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform (DFT)-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c, and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance require- ments, reliability requirements, data throughput require- ments, mobility requirements, and the like. The CN 106/115 may provide call control, billing services, mobile location- based services, pre-paid calling, Internet connectivity, video distribution, etc., and/or perform high-level security func- tions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utiliz- ing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that pro- vide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications net- works owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capa- bilities (e.g., the WTRUs 102a, 102b, 102c, 102d may include multiple transceivers for communicating with dif- ferent wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
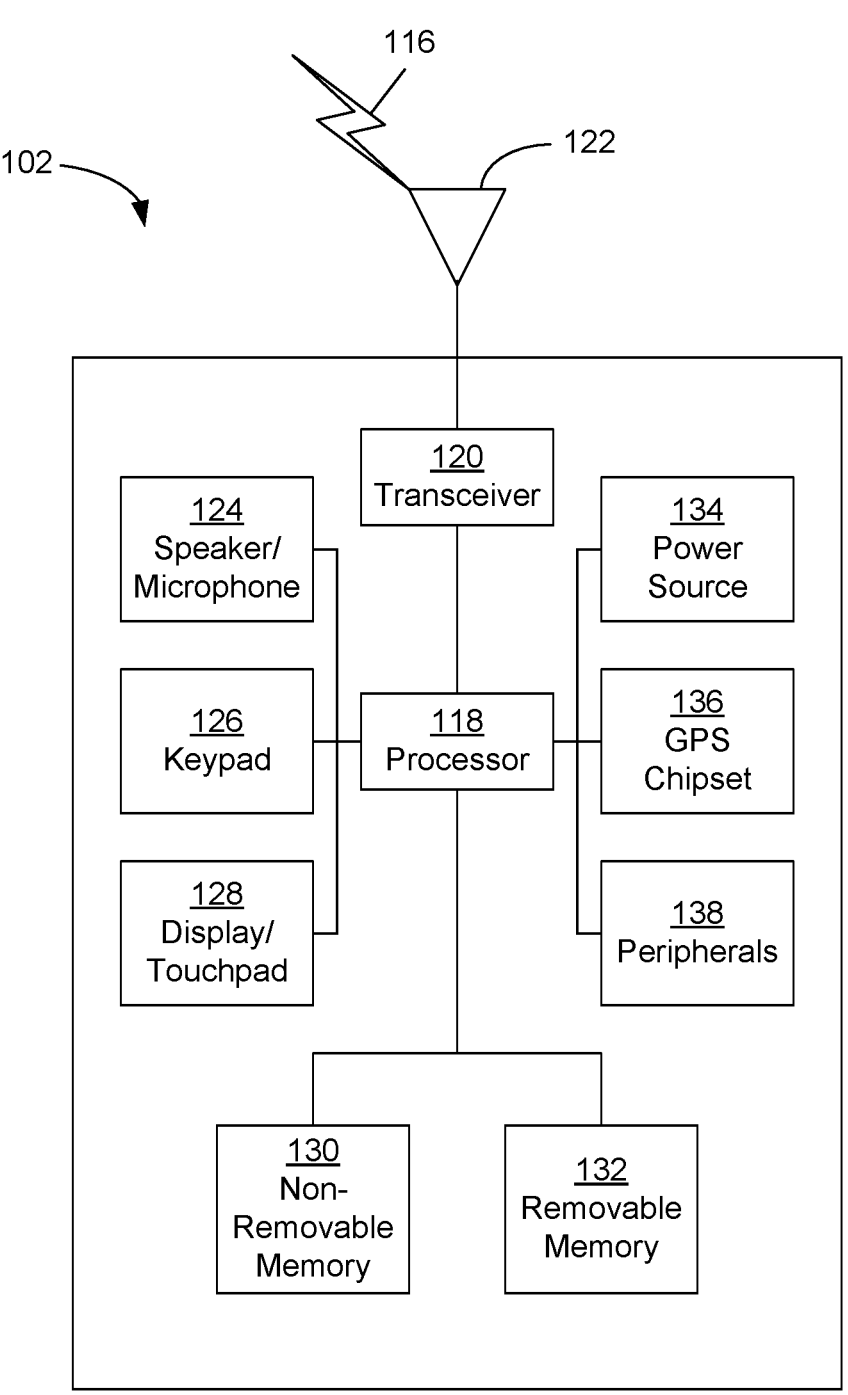
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, remov- able memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digi- tal signal processor (DSP), a plurality of microprocessors, one or more microprocessors in association with a DSP core, a controller, a microcontroller, Application Specific Inte- grated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the proces- sor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifi- cally, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/micro- phone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random- access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Figure 1C:
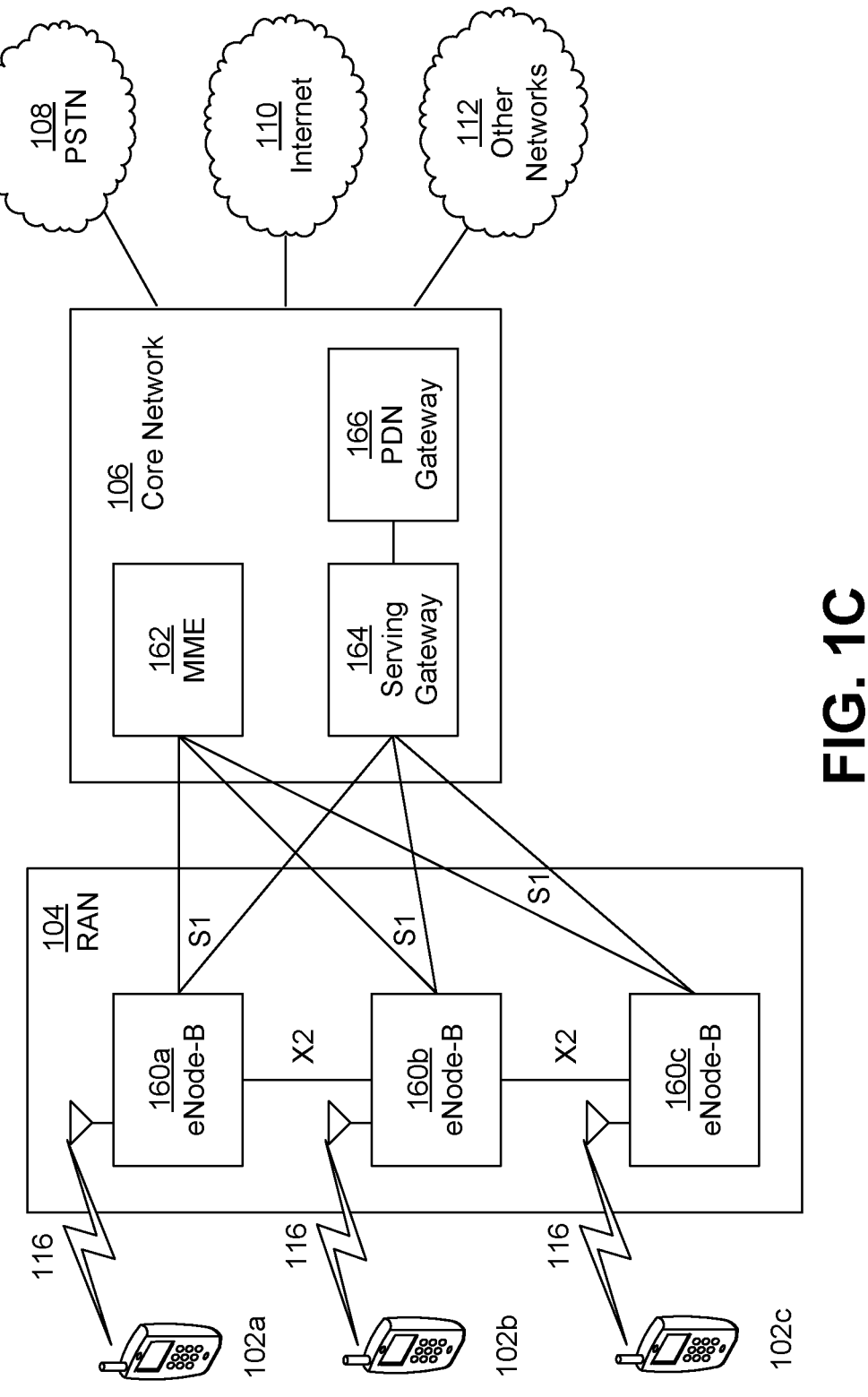
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHZ channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
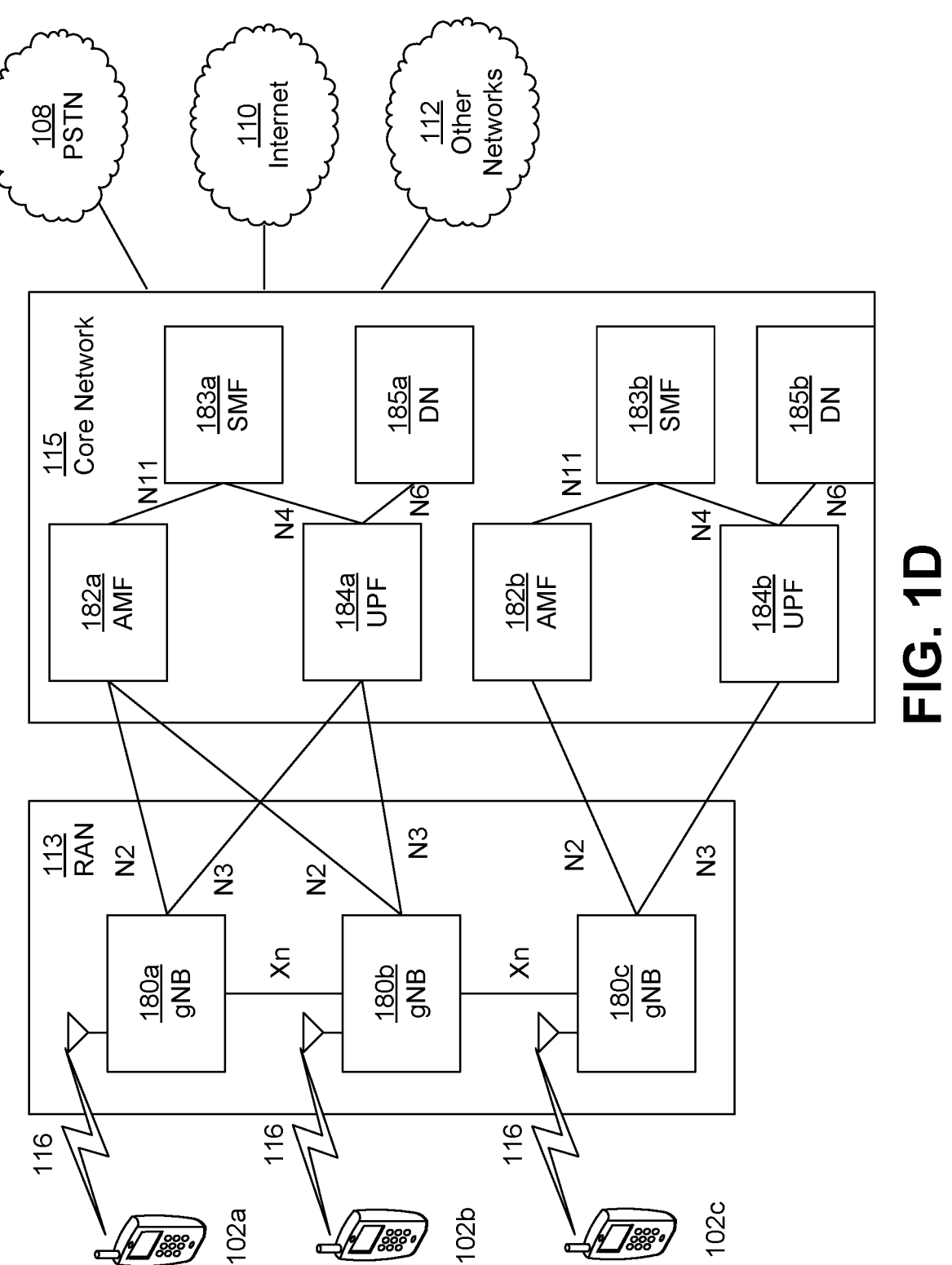
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN

115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are described herein regarding enabling positioning, e.g., in an unlicensed spectrum. A wireless transmit/receive unit (WTRU) may monitor for reference signals (e.g., positioning reference signals) in the unlicensed spectrum. The WTRU may fallback to a different positioning configuration. For example, the WTRU may fallback to monitor for reference signals in the unlicensed spectrum within a discovery reference signal window. For example, the WTRU may fallback to monitor for reference signals in a licensed spectrum. The WTRU may determine to fallback to a different positioning configuration, for example, based on whether reference signals are determined to be missing (e.g., consecutive missing reference signals).

The WTRU may receive configuration information indicating to the WTRU to monitor for positioning reference signals (PRSs), for example, in an unlicensed band. The configuration information may indicate a first threshold (e.g., a first number), for example, associated with a number of consecutive missing PRSs. The WTRU may determine that there is a number of consecutive missing PRSs associated with the unlicensed band. The WTRU may determine that the number of consecutive missing PRSs associated with the unlicensed band is greater than or equal to the first threshold. The WTRU may (e.g., based on the determination that the number of consecutive missing PRSs associated with the unlicensed band is greater than or equal to the first threshold) may perform a first measurement associated with a first set of PRSs. The first set of PRSs may include a first PRS in a DRS window. The first PRS may be determined to be present in the DRS window. The first PRS may be determined to be present in the DRS window based on one or more of the following: first downlink control information (DCI) received in the DRS window (e.g., that indicates that the first PRS is present in the DRS window); a start time associated with the DRS window; a duration associated with the DRS window; etc. The WTRU may send a measurement report, for example, including the first measurement and/or a first indication indicating the first set of PRSs. The WTRU may receive a signal, for example, indicating the start time associated with the DRS window. The WTRU may determine the duration associated with the DRS window, for example, based on the start time associated with the DRS window (e.g., as indicated by the signal).

The WTRU may determine that a PRS (e.g., a second PRS) is missing in the unlicensed band. For example, the WTRU may determine that the PRS (e.g., second PRS) is missing in the unlicensed band based on one or more of the following: a determination that a measurement associated with the second PRS is below a second threshold; a channel occupancy time (COT) indication; a second DCI; etc.

The WTRU (e.g., operating in the unlicensed band outside a DRS window) may perform a measurement (e.g., a second measurement), for example, on a PRS (e.g., third PRS) associated with a second set of PRSs (e.g., second set of PRSs in the unlicensed band outside the DRS window). The WTRU may include in a measurement report, for example, the second measurement and/or an indication that indicates the second set of PRSs.

The WTRU may fallback to a licensed spectrum-based positioning configuration, for example, from an unlicensed spectrum-based positioning configuration (e.g., monitoring for PRS inside a DRS window). The WTRU may determine that a number of PRSs associated with the DRS window is below a threshold (e.g., third threshold). The WTRU may (e.g., based on a determination that the number of PRSs associated with the DRS window is below the third threshold) perform a measurement on a PRS associated with a licensed band. The WTRU may (e.g., based on a determination that the number of PRSs associated with the DRS window is below the third threshold) perform a measurement on a PRS associated with a global navigation satellite system spectrum.

A wireless transmit/receive unit (WTRU) may determine the presence/absence/delay of reference signal(s) (e.g., downlink positioning reference signals ( ) (DL PRS), where DL PRS may be used as an example herein), for example, based on base station (e.g., gNB) indication(s) or based on measurements performed prior to, during, and/or after a configured reference signal (e.g., DL PRS) transmission. If the WTRU determines N missing DL PRS(s) samples (e.g., monitored transmission(s) are missing N DL PRS(s), for example, missing N expected DL PRS(s), the WTRU may fallback to monitor PRS transmission within a discovery reference signal (DRS) window. If the WTRU does not detect a DL PRS in the set of DRS window(s), the WTRU may fallback to a global navigation satellite system GNSS/licensed positioning service.

The WTRU may receive configuration information indicating an SRSp transmission occasion (e.g., multiple SRSp transmission occasions) for an SRSp transmission (e.g., one possible SRSp transmission). The WTRU may transmit and select the SRSp resource, for example, based on whether a DL PRS is received and/or listen-before-talk (LBT) succeeded. The WTRU may receive configuration information indicating a validity time (e.g., validity timer) for an SRSp resource transmission. The WTRU may stop transmission (e.g., transmission attempts) of an SRSp, for example, if the validity time (e.g., via a validity timer) expires.

An unlicensed spectrum may be supported (e.g., in NR). Support for unlicensed spectrum may be extended, for example, to THz bands, where large bandwidth may be available. Operations in the unlicensed spectrum may reduce the cost for the service providers. It may be expected to have more WTRUs operating in the unlicensed spectrum. It may be possible that more WTRUs are deployed in the unlicensed spectrum (e.g., a private 5G network in a factory). Those WTRUs deployed in unlicensed operation may use (e.g., require) positioning services.

In examples (e.g., in unlicensed spectrum), clear channel assessment (CCA) may be performed (e.g., required), for example, prior to a transmission. If the channel is occupied, the transmitter may back-off and try to transmit at a later occasion. A delay on the transmission time, the absence of a positioning reference signal (PRS), or a sounding reference signal for positioning (SRSp) without the knowledge of the WTRU or base station (e.g., gNB) may result in an incorrect position calculation.

A WTRU, base station (e.g., gNB), or a location management function (LMF) may determine if a configured PRS and/or SRSp transmission is transmitted. A WTRU or a base station (e.g., gNB) may process the positioning reference signal, for example, in the unlicensed spectrum.

The WTRU may determine the presence, absence, or delay of (e.g., DL) PRS (e.g., where reference signal, PRS, DL PRS, etc. may be singular or plural)), for example, based on a base station (e.g., gNB) indication(s) or based on the monitoring/measurements performed prior to, during, and/or after the configured DL PRS transmission. The WTRU may fallback to monitor PRS transmission, for example, within a DRS window. The WTRU may fallback to monitor PRS transmission, for example, within a DRS window (e.g., the WTRU may fallback from monitoring/measuring for PRS(s) in a COT, e.g., for data transmission, to monitoring/measuring for PRS in a DRS window). The WTRU may fallback to monitor PRS transmission (e.g., within a DRS window), for example, if the WTRU determines a number (e.g., N) missing DL PRS(s) samples (e.g., monitored transmission(s) are missing N DL PRS(s), for example, N expected DL PRS(s) are not detected in the monitored transmission(s)). The WTRU may fallback to a GNSS or licensed positioning service, for example, if the WTRU is not detecting DL PRS in a set of discovery reference signals (DRS) windows (e.g., one or more DRS windows).

The WTRU may request from the base station (e.g., gNB) to use unlicensed positioning services, for example, based on the positioning service requirements (e.g., high accuracy requirements). The WTRU may receive configuration information indicating to monitor for DL PRS, for example, on a set of possible occasion(s) (e.g., in one or more unlicensed carrier(s). The WTRU may determine the presence or absence of a DL PRS, for example, by one or more of the following: receiving an indication from the base station (e.g., gNB) indicating the base station (e.g., gNB) is transmitting or will transmit PRS, for example, using a channel occupancy time (COT) indication transmitted by the base station (e.g., gNB); or based on measurements, for example, performed prior to, during, and/or after the configured DL PRS. The DL PRS resource configuration may include gap(s), for example, prior to, within, and/or after the configured time domain resources. The WTRU may determine that the DL PRS is not transmitted, for example, if the different energy levels sensed in the different instances are unchanged or the difference is within a certain range.

The WTRU may fallback to monitor for DL PRS within a DRS window, for example, if the PRS is not received in a previous occasion(s) (e.g., not received/detected in the COT indicated by the base station, where the COT indicated by the base station may be for data transmission). The WTRU may receive configuration information indicating a number N (e.g., maximum number) of missed DL PRS (e.g., where N may be a number of PRS that the WTRU fails to detect before taking further action). The WTRU may determine that N DL PRS are not present (e.g., not detected). The WTRU may (e.g., after determining that N PRS were not present/not detected) start monitoring PRS in the DRS window(s) (e.g., subsequent DRS window(s)). The WTRU may report (e.g., to the LMF) the set of received/measured (e.g., successfully received/measured) DL PRS(s) in unlicensed carrier(s) (e.g., along with the measurement report). The WTRU may fallback to use GNSS or licensed spectrum, for example, if DL PRS is not received in a set of DRS window(s). The WTRU may receive configuration information indicating a number (e.g., maximum number) of DRS windows M. The WTRU may fallback to use GNSS/licensed spectrum after not detecting DL PRS in M DRS windows.

Figure 2:
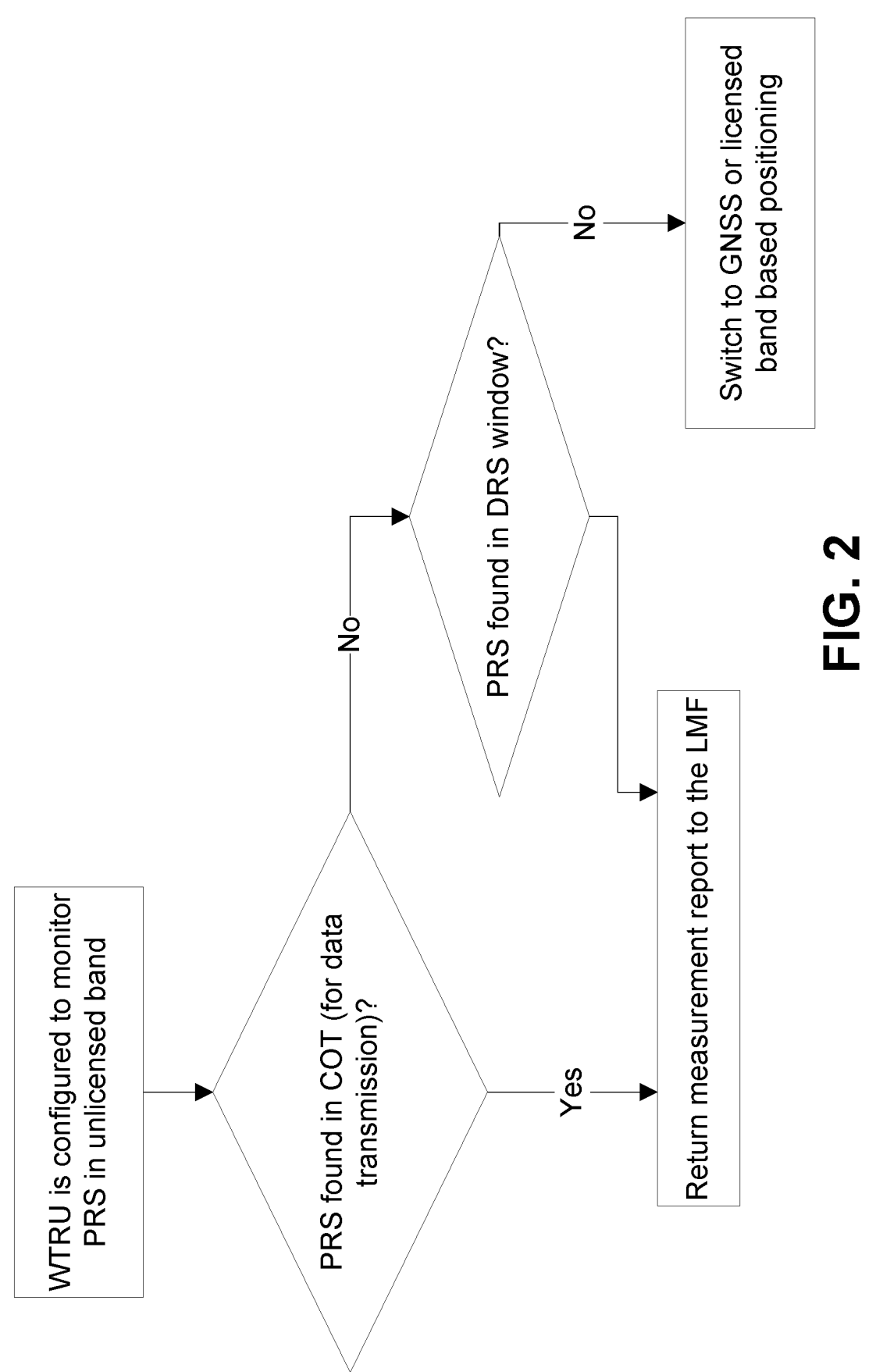
FIG. 2 is a diagram illustrating an example WTRU monitoring for PRS.

FIG. 2 is a diagram of an example WTRU monitoring for PRS.

A WTRU may receive configuration information indicating a (e.g., SRSp) transmission occasion (e.g., multiple SRSp transmission occasions) for a (e.g., SRSp) transmission (e.g., one possible SRSp transmission). The WTRU may transmit and select the (e.g., SRSp) resource, for example, based on whether a DL PRS is received and/or listen-before-talk (LBT) succeeded. The WTRU may receive configuration information indicating a validity time and/or indicating to track a validity time (e.g., via a validity timer) for a (e.g., SRSp) resource transmission. The WTRU may stop a transmission attempt (e.g., of an SRSp), for example, if the validity time (e.g., via the validity timer) expires.

Round trip time (RTT) positioning may be performed.

The WTRU may receive configuration information indicating a SRSp transmission occasion (e.g., multiple SRSp transmission occasion(s) for unlicensed carrier(s), for example, by the base station (e.g., gNB). The multiple SRSp transmission occasions may be grouped on sets of SRSp resources, e.g., a (e.g., each) set may be associated with a DL PRS occasion. The WTRU may determine the presence/ absence of a DL PRS, for example, as described herein. Based on the detected DL PRS resource and remaining resources for UL transmission in COT initiated by the base station (e.g., gNB), the WTRU may select a set of SRSp transmission occasions for (e.g., possible) SRSp transmission. The WTRU may receive configuration information indicating an offset (e.g., maximum offset) between DL PRS and SRSp transmission time. The WTRU may determine whether to use the base station (e.g., gNB) initiated COT or use a different COT, for example, based on the configured offset (e.g., maximum configured offset) and the reception time of the DL PRS. The WTRU may perform LBT and attempt to transmit a SRSp resource, for example, on a selected transmission occasion. The WTRU may receive configuration information indicating a validity time and/or indicating to track a validity time (e.g., via a timer) for an SRSp transmission attempt corresponding to the reception of DL PRS.

The WTRU may start tracking a duration of time (e.g., the validity time, for example via the validity timer) based on receiving a DL PRS (e.g., after receiving a DL PRS). The WTRU may stop tracking the duration of time (e.g., via the timer), for example, if LBT succeeded and SRSp is transmitted. Based on the expiry of the duration of time (e.g., via the timer), if the WTRU is unable to access the channel, the WTRU may refrain from transmitting the SRSp and may send an error message (e.g., to the LMF).

An unlicensed spectrum may provide benefits. An unlicensed spectrum may provide large bandwidth at no cost. In THz bands, wide bandwidth in unlicensed spectrum may be available. As operations in unlicensed spectrum may reduce the cost for the service providers, more WTRUs may operate in unlicensed spectrum, and (e.g., possibly) more WTRUs may be deployed (e.g., only) in the unlicensed spectrum, e.g., in a private 5G network. The WTRUs deployed in unlicensed operation may use (e.g., require) positioning services as well such as WTRUs deployed in a private network in a factory. Increasing the bandwidth may enable more accurate positioning (e.g., as compared with positioning performed with less bandwidth). Use of the unlicensed band may be used as back-up, for example, in case the licensed band is not available for positioning service.

WTRUs may be deployed in unlicensed operation.

Channel access in the unlicensed band may use a listen-before-talk (LBT) mechanism. In some cases, LBT may be used (e.g., mandated) independently of whether the channel is occupied or not. In other cases, transmission after short switching gap may be applied. LBT may be characterized by a clear channel assessment (CCA), where for some LBT types, a fixed sensing duration equal to 16 or 25 us may be used, and for other types, a random number N corresponding to the number of clear idle slots may be used. If a transmitter acquires the channel, the transmitter may occupy the channel during a channel occupancy time (COT). A COT can have a duration (e.g., a maximum duration and a minimum duration). A transmitter can initiate a COT and share it with another transmitter. For example, a base station (e.g., gNB) can initiate a COT (e.g., called gNB initiated COT) and share it with WTRUs for uplink transmission.

In an unlicensed spectrum, clear channel assessment may be performed (e.g., required) prior to a transmission. If the channel is occupied, the transmitter may back-off and attempt to transmit at a later occasion, which may cause a delay in the transmission. For positioning methods, delaying the transmission time of DL PRS and/or SRSp signals or not transmitting at all without the knowledge of the WTRU/base station (e.g., gNB) may result in inaccurate position calculation. For example, the base station (e.g., gNB) may fail to transmit a DL PRS due to LBT failure. The WTRU (e.g., if measuring the DL PRS occasion) may assume that the DL PRS is present and may report wrong measurements to the LMF. For WTRU-based positioning, the WTRU may determine an inaccurate position due to wrongly measured resources (e.g., the WTRU assumes the DL PRS is transmitted by the base station (e.g., gNB) but instead another node is transmitting). In round trip time (RTT) positioning methods, the WTRU may transmit SRSp, for example, after receiving a DL PRS transmission. Failing to transmit SRSp at the configured time (e.g., without the knowledge of the network) may impact RTT calculation. The WTRU, base station (e.g., gNB) and/or LMF may determine if a configured PRS/SRSp transmission is transmitted and at which time it is transmitted. A WTRU and/or base station (e.g., gNB) may process the positioning reference signal in unlicensed spectrum.

A WTRU may receive DL positioning signals in unlicensed spectrum. Positioning may be enabled in the unlicensed spectrum.

A WTRU may request the network to configure and/or enable the DL positioning reference signals on unlicensed spectrum bands. For example, a WTRU may receive configuration information indicating DL positioning reference signals (e.g., only) on the licensed band. The WTRU may request the LMF and/or the serving base station (e.g., gNB) to enable DL positioning measurements on unlicensed bands. The WTRU may request the network to enable DL positioning measurements on unlicensed spectrum, for example, based on one or more of the following: an accuracy positioning requirement, a reliability positioning requirement, a configured carrier(s) and/or cell(s), a WTRU capability, and/or the like.

The WTRU may request the network to enable DL positioning measurements on unlicensed spectrum based on an accuracy positioning requirement. For example, the WTRU may request DL PRS on unlicensed spectrum for an accuracy positioning requirement (e.g., high accuracy positioning requirement) type of service.

The WTRU may request the network to enable DL positioning measurements on unlicensed spectrum based on a reliability positioning requirement. For example, the WTRU may request DL PRS on unlicensed spectrum for a reliability requirement (e.g., moderated reliability requirement) type of service.

The WTRU may request the network to enable DL positioning measurements on unlicensed spectrum based on a configured carrier(s) and/or cell(s). The WTRU may request configuration information of DL PRS on unlicensed spectrum, for example, if the WTRU is configured with the unlicensed/shared spectrum carrier.

The WTRU may request the network to enable DL positioning measurements on unlicensed spectrum based on the WTRU capability. A WTRU may request the configuration of DL PRS on unlicensed spectrum, for example, if the WTRU is capable of unlicensed/shared band operations.

PRS and PRS resource may be used interchangeably herein.

FIG. 3 is a diagram of an example WTRU monitoring for PRS.

DL PRS may receiving configuration information indicating to operate in the unlicensed spectrum (e.g., as shown in FIG. 3). The WTRU may receive configuration information indicating DL PRS on the unlicensed spectrum, for example, if the WTRU is enabled with a positioning service on the unlicensed spectrum. In examples, a WTRU may receive configuration information indicating an occasion (e.g., multiple occasions) to monitor a DL PRS transmission. The WTRU may monitor the occasion (e.g., multiple occasions) to detect a possible transmission, for example, if the base station (e.g., gNB) succeeds in acquiring the channel after channel access procedures (e.g., LBT procedures). The WTRU may receive configuration information (e.g., from the network) indicating (e.g., multiple) occasions of a DL PRS transmission, for example, in the time domain and/or in frequency domain. In examples, a set of time opportunities (e.g., consecutive time opportunities) may be configured for a DL PRS. In examples, the WTRU may receive configuration information indicating time opportunities (e.g., non-contiguous time opportunities) for a DL PRS transmission. The WTRU may monitor the set of opportunities (e.g., configured opportunities) until the WTRU determines that a DL PRS is transmitted. The WTRU may determine the presence/absence of DL PRS.

In examples, a WTRU may receive configuration information indicating a set of DL PRS resources that can be part of a DRS window (e.g., as described herein). In examples, the WTRU may monitor (e.g., always monitor) the DL PRS resources configured within the DRS window (e.g., as shown in FIG. 3). The WTRU may start to monitor the DL PRS resources within DRS window, for example, after (e.g., only after) being triggered to fallback to monitor DL PRS on the DRS window (e.g., as described herein).

The WTRU may determine the presence of DL PRS based on measurements. In examples, a WTRU may (e.g., receive configuration information indicating to) determine the presence and/or the absence of a DL PRS based on measurements results. In examples, a WTRU may (e.g., receive configuration information indicating to) determine the presence and/or the absence of DL PRS based on the reference signal received power (RSRP). The WTRU may determine that DL PRS is transmitted by the base station (e.g., gNB) or transmission/reception point (TRP), for example, if the RSRP measured (e.g., during a configured time/frequency opportunity) for DL PRS is above a configured threshold. Otherwise, the WTRU may assume that DL PRS is not transmitted by the base station (e.g., gNB) or TRP. In examples, a WTRU may (e.g., receive configuration information indicating to) determine the presence and/or the absence of DL PRS based on measurements the WTRU performs prior to, during, and/or after the configured DL PRS. For example, a DL PRS transmission opportunity may include gap(s) prior to, within, and/or after the configured time domain resources. The WTRU may measure the energy/power level in the gap(s) as well as in the configured resources. The WTRU may determine that the DL PRS is absent and is not transmitted by the base station (e.g., gNB) or TRP, for example, if the different energy levels sensed in the different instances are unchanged or the difference is within a configured range.

The WTRU may determine the presence of DL PRS based on a COT indication and/or DCI received from the base station (e.g., gNB), for example, as shown in FIG. 3. In examples, a WTRU may (e.g., receive configuration information to) determine the presence and/or absence of a DL PRS based on the COT indication and/or DCI received from the base station (e.g., gNB). The COT indication may indicate to the WTRU the set of slot(s) and/or symbol(s) scheduled for downlink transmissions, the set of slot(s) and/or symbol(s) scheduled for flexible transmissions, the set of slot(s) and/or symbol(s) scheduled for uplink transmission, and/or the COT duration and the sub-band(s) acquired by the base station (e.g., gNB)/TRP. The COT indication and/or DCI may be received by the WTRU, for example, from the serving base station (e.g., gNB). The WTRU may receive the COT indication from a non-serving cell. The WTRU may receive DCI configuration information indicating to receive the COT indication and/or to receive DCI indicating DL PRS presence from non-service cell. The configuration information may include one or more of the following: CORESET configuration information (e.g., including frequency allocation, demodulation reference signal(s) (DM-RS) scrambling sequence initialization, a precoder granularity, a number of consecutive symbols, the CORESET duration), and/or a control channel element (CCE)-to-resource element group (REG) mapping), search space set configuration information (e.g., including a monitoring periodicity, a monitoring pattern within a slot, a duration of the monitoring pattern, a number of PDCCH candidates per CCE aggregation level, and/or a number of aggregation levels), and/or DCI format configuration information.

The WTRU may be configured by the serving cell (e.g., via RRC signaling) with DCI configuration information to receive the COT indication and/or DCI indicating DL PRS presence from a non-serving cell. The WTRU may (e.g., receive configuration information indicating to) monitor and decode the broadcasted system information (SIB) from the non-serving cell to determine the DCI configuration information.

In examples, a WTRU may determine that a DL PRS may be present if one (e.g., at least one) of the configured occasion(s) (e.g., multiple configured occasion(s)) for DL PRS transmission has the configured symbols (e.g., all the configured symbols) indicated as downlink symbol(s) by COT indication and the resource element and/or RBs of the DL PRS occasion are within an acquired sub-band by the base station (e.g., gNB). In examples, a WTRU may determine that a DL PRS may be present if one (e.g., at least one) of the configured occasion(s) (e.g., multiple configured occasion(s)) for DL PRS transmission has the configured symbols (e.g., all the configured symbols) occurring within the indicated COT duration and the resource element and/or RBs of the DL PRS occasion are within an acquired sub-band by the base station (e.g., gNB). The WTRU may select the first occurring occasion in a time domain, for example, if the WTRU determines that more than one DL PRS occasion may be present. The WTRU may receive a signaling indicating which of the occasions on which the WTRU may assume the DL PRS to be transmitted. Such signaling may be transmitted along with the DCI carrying the COT indication or a separate DCI may be transmitted to indicate the occasion for DL PRS transmission. In examples, a WTRU may receive configuration information indicating a time offset between the start of the COT to the first time a WTRU can assume that a DL PRS may be present.

The WTRU may (e.g., receive configuration information indicating to) measure a number of samples (e.g., M samples) of PRS, for example, to determine whether the PRS is present or not. The number of samples may be one (e.g., or larger than one) sample. One sample of PRS may be defined by one PRS resource (e.g., PRS spanning the configured number of OFDM symbols or slots) or repetitions of one PRS resource. The WTRU may measure the number of samples (e.g., default number of samples) of PRS. The WTRU may increase the number of samples to determine whether the PRS is present or not, for example, if a measurement condition is not satisfied (e.g., the RSRP of PRS is below the preconfigured threshold).

A WTRU may fall back to monitor DL PRS in a DRS window (e.g., as shown in FIG. 3). Discovery reference signals (DRS) may be a group of signals and channels that are transmitted by the base station (e.g., gNB), for example, periodically. A DRS window may be a window where DRS can be transmitted. The starting time of a DRS within the DRS window may vary from one DRS window to another, for example, depending on the outcome of the channel access procedure (e.g., LBT procedure). The starting time of a DRS within the DRS window and/or the DRS window may be indicated, for example, in a received signal or channel. A DRS duration may vary from one DRS window to another depending on when the DRS transmission started. The DRS duration and/or DRS window duration may be determined, for example, based on the starting time of the DRS window.

In examples, a WTRU may (e.g., receive configuration information indicating to) monitor DL PRS within the DRS window. In examples, a WTRU may (receive configuration information indicating to) fallback to monitor DL PRS within the DRS window, for example, if DL PRS is not received in a previous occasion(s). A WTRU may receive configuration information indicating a number (e.g., maximum number) of missed DL PRS samples N (e.g., a number of consecutively missed DL PRS samples, such as, a first threshold, for example, as shown in FIG. 3). A WTRU may determine the number of DL PRS that are not present. For example, the WTRU may determine a PRS is missing in the unlicensed spectrum based on one or more of the following: a determination that a measurement associated with the PRS is below a threshold; a COT indication; DCI; etc. The WTRU may start monitoring DL PRS within the DRS window, for example, if the determined number is above the configured number (e.g., maximum configured number) N. The determined number of missed DL PRS may be consecutive missed DL PRS or non-consecutive missed DL PRS. In examples, a WTRU may receive an indication from the network to start monitoring for DL PRS in the DRS window. The WTRU may determine to start monitoring for DL PRS in the DRS window, for example, based on a determination that the determined number of missed (e.g., consecutive missed) DL PRS is greater than or equal to the first threshold. The indication may be transmitted from a serving cell and indicate to the WTRU to start monitoring the DRS window(s) in a non-serving cell(s) for DL PRS transmission. Such indication may be transmitted to the WTRU using signaling (e.g., higher layer signaling (e.g., RRC signaling), or dynamic signaling). For example, a WTRU may receive (e.g., group common) DCI that may carry a list of cells (e.g., including both serving cells and non-serving cells) for which the WTRU may (e.g., need to) monitor DL PRS within the DRS window of each cell.

The WTRU may be (pre-) configured with multiple DRS windows for a serving cell and/or a non-serving cell (e.g., both serving cell and non-serving cell) that may have DL PRS transmission and which the WTRU may monitor. Such configuration information can be signaled (e.g., using RRC WTRU specific configuration information or using RRC common configuration information). The WTRU may determine the DRS windows configurations, for example, by decoding the SIBs of non-serving cells. The WTRU may determine the set of non-serving cells, for example, based on the configured DL PRS resources and the associated cells. The DRS window configuration may include the DRS window start position/offset (e.g., relative to the start of the frame), the DRS window periodicity, the DRS window frequency location, and/or the DRS window bandwidth.

Figure 4:
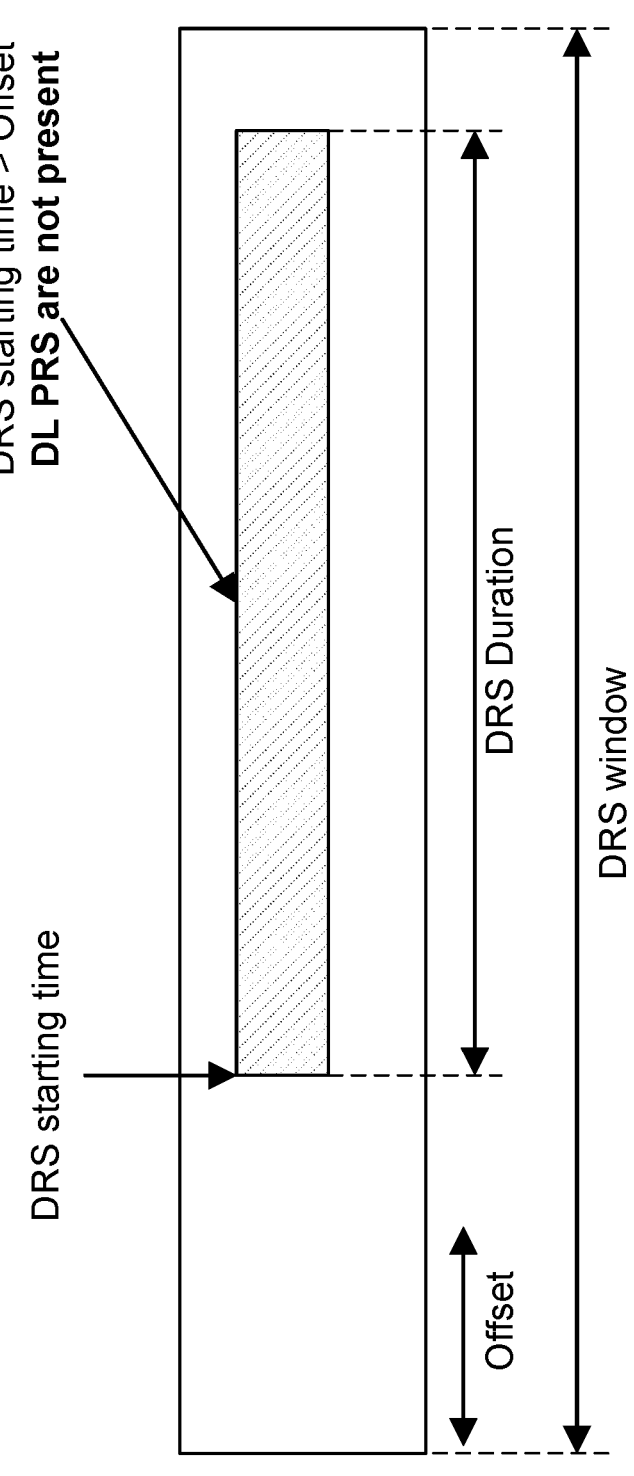
FIG. 4 illustrates a diagram of an example DRS window not containing DL PRS due to the starting time of DRS.

In examples, a WTRU may determine the presence or the absence of DL PRS within a DRS window based on an additional indication (e.g. DCI), for example, transmitted by the cell during the DRS window (e.g., as shown in FIG. 3). For example, if the WTRU starts monitoring DL PRS within the DRS window, the WTRU may start monitoring for DCI indicating whether DL PRS is present in DRS window or not. In examples, the DCI may be transmitted after the DL PRS occasion. In that case, the WTRU may discard the measurement results performed on a DL PRS occasion, for example, if the DCI is indicating that DL PRS was not transmitted. In examples, the DCI may be transmitted before the DL PRS occasion. In that case, the WTRU may monitor DL PRS, for example, if (e.g., only if) the cell is indicating DL PRS will be transmitted. In examples, a WTRU may determine the presence or the absence of DL PRS within a DRS window based on the DRS transmission starting time (e.g., DRS window start time), the DRS transmission duration (e.g., DRS window duration), and/or DRS transmission bandwidth (e.g., as shown in FIG. 3). The WTRU may determine that DL PRS is not transmitted in the DRS window, for example, if a DRS transmission starts after a configured offset from the start of DRS window (e.g., as shown in FIG. 4). The WTRU may determine that DL PRS is not transmitted in the DRS window, for example, if a DRS transmission duration is less than a threshold. The WTRU may determine that DL PRS is not transmitted in the DRS window, for example, if a DRS transmission bandwidth is smaller than a reference bandwidth and the DRS duration is less than a threshold.

FIG. 4 illustrates a diagram of an example DRS window not containing DL PRS due to the starting time of DRS.

The WTRU may combine measurements (e.g., in a measurement report) associated with DL PRS (e.g., measurement results associated with DL PRS), for example, (e.g., performed) within the DRS window and outside the DRS window. The WTRU may include in a measurement report, for example, measurements associated with PRS in the unlicensed spectrum (e.g., PRS outside the DRS window and/or PRS inside the DRS window). The WTRU may include in a measurement report, for example, the PRSs in the unlicensed spectrum used for the measurements (e.g., a first set of PRSs in the unlicensed spectrum outside the DRS window and/or a second set of PRSs in the unlicensed spectrum inside the DRS window). In examples, a WTRU may combine the measurements results of DL PRS performed within DRS window(s) and outside the DRS window (s). A WTRU may apply an average (e.g., weighted average) of the DL PRS measurements within the DRS window and outside the DRS window, for example, with different weights. DL PRS measurements within the DRS window may be associated with a higher weight compared to a weight associated with measurements performed outside the DRS window. The associated weights may be indicated (e.g., semi-statically or fixed). A WTRU may exclude the measurements results performed outside the DRS window. A WTRU may exclude the measurements results of DL PRS outside the DRS window, for example, based on falling back to monitor the DRS window.

The WTRU may report the received DL PRS. A WTRU may report to the network the set of received and/or measured DL PRS signals (e.g., as shown in FIG. 3). the WTRU may report to the LMF the set of successfully received and/or measured DL PRS(s) in unlicensed carrier(s), for example, along with the measurement report (e.g., using LTE positioning protocol (LPP)). The WTRU may report to the base station (e.g., gNB) the set of successfully received and/or measured DL PRS(s) in unlicensed carrier(s), e.g., via RRC signaling. A WTRU may report the transmission occasion where the DL PRS was measured. A DL PRS (e.g., DL PRS configuration information) may indicate one or more transmission occasion(s) (e.g., two transmission occasions), and one of the occasions may be used by the base station (e.g., gNB)/TRP, for example, based on the LBT outcome. The WTRU may report on which occasion the WTRU performed the DL PRS measurements.

An LMF may be a node or entity (e.g., network node or entity), for example, that may be used for positioning or used to support positioning. A node or entity (e.g., any other node or entity) may be substituted for LMF.

DL PRS reconfiguration may be performed. The WTRU may determine whether one or more DL PRS occasions (e.g., additional DL PRS occasions) are transmitted between multiple (e.g., two) configured (e.g., pre-configured) DL PRS occasions, for example, based on whether the WTRU receives the DL PRS in the current occasion. The WTRU may assume that there is one or more additional DL PRS occasions to perform DL PRS reception after the current DL PRS occasion, for example, if the WTRU does not receive/ detect DL PRS on one occasion. The WTRU may (e.g., then) perform DL PRS reception on the additional DL PRS occasions. The WTRU may assume (e.g., determine) that there is no additional DL PRS occasion between two configured (e.g., pre-configured) DL PRS occasions, for example, if the WTRU receive DL PRS on one occasion. The location and the number of additional DL PRS occasions may be indicated (e.g., configured by) the base station (e.g., gNB) or LMF.

For example, the WTRU may receive DL PRS from a (e.g., one) base station (e.g., gNB) every T ms. If the WTRU receives DL PRS on a (e.g., one, a first) occasion, the WTRU may assume (e.g., determine) that the next DL PRS occasion is T ms after the current (e.g., the first) occasion. If the WTRU does not detect DL PRS in the current (e.g., the first) occasion, the WTRU may assume (e.g., determine) that the next DL PRS occasion is 0.5 T ms after the current (e.g., the first) configured DL PRS occasion.

The WTRU may fall back to use the licensed spectrum and/or GNSS (e.g., as shown in FIGS. 2-3). Conditions may be provided (e.g., indicated) to initiate fallback (e.g., default) positioning operation.

In examples, the WTRU may receive configuration information from the network (e.g., LMF, gNB), which may indicate the number of DRS windows during which the WTRU may monitor for PRS. The WTRU may be monitor (e.g., monitor up to) M DRS windows for PRS, for example, if the number of DRS windows is denoted (e.g., indicated) as M. The WTRU may receive configuration information (e.g., from the network) to measure (e.g., measure up to) N PRS resources during M DRS windows (e.g., where N is an integer greater than 1). The WTRU may (e.g., determine to) initiate the fallback (e.g., default) positioning method (e.g., positioning using the licensed spectrum or GNSS), for example, if the WTRU cannot observe/detect N PRS resources over M DRS windows (e.g., as shown in FIG. 3).

The WTRU may determine the fallback (e.g., default) positioning operation. The WTRU may receive configuration information (e.g., from the network) indicating the default/fallback positioning operation for the WTRU to use, for example, if the WTRU cannot measure the number (e.g., configured number) of PRS resources within the number (e.g., configured number) of DRS windows. In examples, the fallback (e.g., default) positioning operation may be the positioning operation the WTRU used before the unlicensed positioning was initiated.

The WTRU may determine to use the fallback (e.g., default) positioning operation, for example, if at least one of the following conditions is satisfied: the configured PRS resources cannot be measured within the configured time limit; measurements made associated with the PRS are below the preconfigured threshold; uncertainty of measurements associated with the PRS exceeds the preconfigured threshold; or misalignment of DRS windows with periodicities of PRS transmission.

The WTRU may (e.g., determine to) use the fallback (e.g., default) positioning operation, for example, if configured PRS resources were not able to be measured within the configured time limit. The WTRU may start tracking a duration of time (e.g., via a timer), for example, if (e.g., when) unlicensed positioning is initiated by the network or WTRU. The WTRU may (e.g., determine to) initiate a fallback (e.g., default) positioning operation, for example, if the WTRU cannot observe the configured number of PRS resources in the DRS windows based on the duration of time expiring (e.g., via timer expiry). The WTRU may receive configuration information related to the duration of time (e.g., timer), for example, independently from the configuration information related to the DRS windows.

The WTRU may (e.g., determine to) use the fallback (e.g., default) positioning operation, for example, if measurements made on PRS (e.g., RSRP) are below the preconfigured threshold. The WTRU may receive configuration information indicating the thresholds (e.g., from the network). The WTRU may refrain from considering (e.g., not consider) PRS measurable, for example, if RSRP corresponding to the PRS is below the threshold. The WTRU may refrain from including such measurements in the report and refrain from tracking a count (e.g., incrementing a counter to count) for measurable PRS and continue to monitor DRS windows.

The WTRU may determine to use the fallback (e.g., default) positioning operation, for example, if an uncertainty of measurements on PRS (e.g., standard deviation/variance/range of RSRP, TDOA, time of arrival, AoA, AoD) exceeds the preconfigured threshold. The WTRU may refrain from including RSRP in the measurement report, for example, if its value (e.g., maximum value) in the range is above the preconfigured threshold, and/or the value (e.g., minimum value) of the range is below the preconfigured threshold. The WTRU may refrain from including such measurements in the report and refrain from tracking a count (e.g., incrementing a counter to count) for measurable PRS and continue to monitor DRS windows.

The WTRU may determine to use the fallback (e.g., default) positioning operation, for example, if there is misalignment of DRS windows with periodicities of PRS transmission. For example, the WTRU may receive configuration information indicating periodicities of PRS transmission. The WTRU may determine to initiate the fallback (e.g., default) positioning operation, for example, if DRS windows are not aligned with periodicity of PRS transmission for K occasions (e.g., where K is an integer greater than 1). A misalignment occasion between the DRS window may be (e.g., defined by) an instance during which the difference between PRS reception time and start of the DRS window (e.g., DRS starting time) exceeds the preconfigured threshold. The WTRU may determine to initiate the fallback (e.g., default) positioning operation, for example, if the number of occasions for misalignment exceeds the preconfigured threshold.

Actions may be performed by the WTRU if (e.g., when) initiating the fallback (e.g., default) positioning operation. The WTRU may send an indication to the network (e.g., LMF, gNB) to initiate fallback/default positioning operation (e.g., fallback/default positioning operation needs to be initiated), for example, if the WTRU initiates the fallback/default poisoning operation. The WTRU may include indication(s) to the network including which condition was satisfied to trigger the fallback (e.g., default) positioning operation. The WTRU may receive (e.g., preconfigured) thresholds from the network (e.g., LMF, gNB).

The WTRU may transmit (e.g., UL) positioning signals in the unlicensed spectrum. Channel access procedures or LBT procedures on the unlicensed spectrum may include a WTRU, base station (e.g., gNB), or TRP sensing the channel for a configured duration (e.g., sensing duration). A channel access procedure may succeed or LBT may succeed, for example, if the WTRU or base station (e.g., gNB) or TRP senses an energy that is below a threshold during the sensing duration (e.g., energy detection threshold). There may be multiple channel access procedures types or LBT types, for example, where each type may have a different sensing duration and/or energy detection threshold.

Positioning in unlicensed spectrum may be enabled. In examples, a WTRU may request the base station (e.g., gNB) to enable the SRSp transmission on the unlicensed band. The WTRU may request SRSp resource configuration information on the unlicensed spectrum, for example, based on one or more of the following: an accuracy positioning requirement (e.g., the WTRU may request SRSp resource on the unlicensed spectrum for a high accuracy positioning requirement type of service); a reliability positioning requirement (e.g., the WTRU may request SRSp resource on the unlicensed spectrum for a moderated reliability requirement type of service); configured carriers/cells (e.g., the WTRU may request the configuration information of the SRSp resource on the unlicensed spectrum, for example, if the WTRU is configured with an unlicensed/shared spectrum carrier); or WTRU capability (e.g., a WTRU may request the configuration information of the SRSp resource on the unlicensed spectrum, for example, if the WTRU is capable of unlicensed/shared band operations).

A WTRU may transmit (e.g., start transmitting) SRSp resources in the unlicensed spectrum, for example, based on receiving DL PRS resources in the unlicensed spectrum. For example, a WTRU may receive configuration information indicating SRSp in the unlicensed spectrum and DL PRS resources in the unlicensed spectrum. The WTRU may monitor for DL PRS (e.g., on a set of occasions), and the WTRU may start SRSp transmission on the unlicensed band, for example, based on determining that DL PRS is transmitted on one of the occasions.

In examples, a WTRU may start transmitting SRSp resources in the unlicensed spectrum after moving out-of-coverage of a cell (e.g., a cell using a licensed band where SRSp is configured). For example, a WTRU may receive configuration information indicating a SRSp resource on the licensed spectrum. The WTRU may move out of coverage of the cell, for example, due to WTRU's mobility. The WTRU may transmit (e.g., start transmitting) SRSp on the unlicensed band. The WTRU may determine the out-of-coverage state, for example, based on RLM and/or RLF procedures. The WTRU may transmit (e.g., start transmitting) SRSp on the licensed band, for example, if the WTRU declares radio link failure on the licensed band cell. In examples, a WTRU may receive configuration information indicating DL reference signals to monitor the state of licensed band on a cell. The WTRU may transmit (e.g., start transmitting) SRSp on the unlicensed spectrum, for example, if the WTRU determines that the RSRP of DL reference signal is below a threshold.

SRSp configuration information may be provided in the unlicensed spectrum. The WTRU may receive configuration information indicating an SRSp transmission occasion (e.g., multiple SRSp transmission occasions) for SRSp transmission in the unlicensed band. The WTRU may transmit (e.g., attempt to transmit) on different occasions and transmit on one of the occasions, for example, if the channel access procedures succeeds (e.g., LBT succeeds). A set of SRSp resources may be associated with a DL PRS occasion(s), for example, for an RTT positioning operation. For example, the WTRU may monitor multiple DL PRS occasions to detect a possible transmission, for example, if the base station (e.g., gNB) LBT procedure succeeds. For a (e.g., each) DL PRS occasion, a set of SRSp resources may be used by the WTRU to transmit SRSp, for example, based on detecting a DL PRS transmission on the configured occasion. The WTRU may transmit (e.g., transmit only) on a SRSp resource (e.g., one SRSp) resource from the configured set. The WTRU may receive configuration information indicating a set index (e.g., identifying the set of SRSp resources associated with DL PRS occasion). DL PRS occasion configuration information may include the set index of the set of SRSp resources.

The WTRU may select SRSp and initiate COT for transmission in the unlicensed spectrum. A WTRU may determine the presence or the absence of DL PRS signals in DL PRS occasions (e.g., different configured DL PRS occasions), for example, as described herein. In examples, a WTRU may select a set of SRSp resources, for example, based on the detected occasion for DL PRS transmission. The WTRU may select from the set of SRSp resources an SRSp resource to transmit the SRSp, for example, depending on the LBT outcome, e.g., the first available resource after LBT success. A WTRU may receive configuration information indicating an offset (e.g., maximum offset) between DL PRS and SRSp transmission time. A WTRU may determine whether to use base station (e.g., gNB) initiated COT or initiate its own COT to transmit SRSp. A WTRU may determine whether to use base station (e.g., gNB) initiated COT or initiate its own COT (e.g., WTRU initiated COT), for example, based on the time reception of DL PRS and the remaining COT duration. The WTRU may start its own COT to transmit SRSp, for example, if the WTRU receives DL PRS transmission in the last N symbols/slots of the base station (e.g., gNB)-initiated COT. A WTRU may use the base station (e.g., gNB)-initiated COT to transmit SRSp, for example, if the WTRU receives DL transmission in the first M symbols/slots of the base station (e.g., gNB)-initiated COT. In examples, a WTRU may receive an indication indicating whether to use base station (e.g., gNB)-initiated or WTRU-initiated COT for SRSp transmission. A WTRU may determine whether to use the base station (e.g., gNB)-initiated COT, for example, based on the resource characteristics of the received DL PRS. The WTRU may determine whether to use base station (e.g., gNB) initiated COT or not, for example, based on the sequence used for DL PRS transmission. A WTRU may receive an indication indicating DL PRS sequences that are transmitted, for example, in the case where the WTRU can use base station (e.g., gNB) initiated COT.

A validity time (e.g., via a validity timer) may be provided, configured, and/or tracked for SRSp transmission. A WTRU may receive configuration information indicating (e.g., multiple) SRSp transmission occasions. Depending on the reception time of DL PRS and the outcome of channel access procedures (e.g., LBT procedures), the WTRU may select an occasion (e.g., one of the occasions) to transmit SRSp. A WTRU may receive configuration information indicating a validity time (e.g., via a validity timer) for SRSp transmission. The WTRU may stop transmitting (e.g., attempting to transmit) SRSp and SRSp transmission may be dropped, for example, based on expiry of the validity time (e.g., via the validity timer). The WTRU may stop and reset the (e.g., tracking of the) validity time (e.g., via the validity timer), for example, based on successfully transmitting SRSp. In examples, a WTRU may start tracking the validity time (e.g., via the validity timer) for an SRSp transmission, for example, based on the reception of DL PRS transmission. For example (e.g., for RTT positioning operation), the WTRU may start tracking the validity time (e.g., via the validity timer) for SRSp transmission, for example, if the WTRU receives a DL PRS transmission. A WTRU may receive an indication from the base station (e.g., gNB) to reset and/or start tracking the validity time (e.g., via the validity timer). The WTRU may receive DCI indicating to the WTRU to reset the validity time (e.g., via the validity timer), for example, if the WTRU is transmitting (e.g., attempting to transmit) SRSp and prior to the expiry of the validity time (e.g., via the validity timer). This case may occur if the base station (e.g., gNB) acquires the channel in the unlicensed spectrum and the base station (e.g., gNB) may share it with the WTRU to transmit SRSp. The reset and/or start indication of the validity time (e.g., via the validity timer) may be transmitted (e.g., transmitted explicitly) to the WTRU, for example, using a bitfield in DCI. The WTRU may be triggered to reset the validity time (e.g., via the validity timer) based on one or more of the following: reception of a COT indication from the base station (e.g., gNB), for example, if the WTRU receives a COT indication from the network indicating that gNB acquired the channel, the WTRU may reset the validity time (e.g., via the validity timer); or falling back to monitor DL PRS within the DRS window, for example, if the WTRU performs fallback to monitor DL PRS within the DRS window, the WTRU may reset the validity time (e.g., via the validity timer).

A WTRU may reset the validity time (e.g., the validity timer), for example, based on acquiring the channel (e.g., LBT succeeds). For example, a WTRU may (e.g., attempt to) acquire the channel to transmit an UL transmission in addition to SRSp transmission. The WTRU may reset the validity time (e.g., the validity timer), for example, if the WTRU acquires the channel to transmit the UL transmission.

A WTRU may transmit an error message to the network, for example, based on expiry of the validity time (e.g., the validity timer). The WTRU may transmit the error message to the base station (e.g., gNB) and/or the LMF. In case the WTRU is transmitting the error message to the base station (e.g., gNB), the WTRU may use signaling (e.g., via RRC signaling) or an uplink control information (UCI) transmission. In case the WTRU is transmitting the error message to the LMF, the WTRU may use LPP signaling.

The WTRU may report SRSp transmission failure. In examples, a WTRU may report the set of failed and/or succeeded SRSp transmissions in the unlicensed band. In examples, a WTRU may report a bitmap with a size (e.g., equal to the configured SRSp transmission occasion). A WTRU may use a 1 value for a transmitted occasion and a 0 value for a non-transmitted occasion. In examples, a WTRU may report the SRSp resource indices of transmitted and/or failed SRSp transmission. In examples, a WTRU may report the SRSp transmission statistics. For example, a WTRU may report the number (e.g., total number) of failed or number (e.g., total number) of succeeded SRSp transmissions. In examples, a WTRU may report the rate of failed or the rate of succeeded SRSp transmission over a time duration.

In examples, a WTRU may transmit the time of arrival, RSRP, and/or the angle of arrival of the received DL PRS signals, for example, based on failing to transmit SRSp resources. For example (e.g., for the RTT positioning operation), the WTRU may receive a DL PRS transmission and transmit (e.g., attempt to transmit) SRSp transmission in response to DL PRS. The WTRU may fail to access the unlicensed channel in the configured time and/or prior to the validity time expiring (e.g., via the validity timer expiry). The WTRU may report the time of arrival, angle of arrival, and/or RSRP of the received DL PRS signals at a later uplink transmission occasion.

A WTRU may report the reports (e.g., report(s) described herein) to the LMF (e.g., using LPP protocol) or may report to the base station (e.g., gNB) the reports (e.g., via RRC signaling or lower layer signaling such as via the physical layer or MAC layer).

The WTRU may determine which parameters to report. In examples, the WTRU may determine which parameter to report in the positioning measurement report, for example, based on whether SRSp is transmitted. If SRSp is transmitted, the WTRU may report a Tx-Rx time. The WTRU may (e.g., otherwise) report RSTD and/or DL PRS ToA, AoA, etc., for example, if SRSp is not transmitted.

The WTRU may report measurements results. The WTRU may receive configuration information indicating whether it can report positioning reports on the unlicensed spectrum. The WTRU may receive configuration information indicating one or more cells, BWPs, and/or UL resources or grants over which it may report positioning reports. The WTRU may include an indication part of the positioning report indicating that unlicensed spectrum may be used to report the WTRU's position.

The WTRU may receive configuration information indicating to track a time (e.g., a validity time, for example, via the validity timer) or period of time over which the WTRU may report a measured position. For example, the WTRU may consider measured positions valid over a period of time (e.g., only over a period of time), after which the WTRU may refrain from reporting them or reports them with a time stamp. The WTRU may start tracking a time (e.g., start a timer) based on measuring the PRS associated with measurement or transmitting UL SRSp associated with the WTRU's position on an unlicensed cell. The WTRU may report the positioning report while the time is being tracked (e.g., timer is running). The WTRU may report the positioning report with a time stamp of the measurement time or refrain from reporting it (e.g., anymore at all), for example, based on the time expiring (e.g., via timer expiry). The WTRU may start tracking the time (e.g., start the timer)

based on mobility to an unlicensed cell. The WTRU may consider the time (e.g., timer) only for cells operating in the unlicensed spectrum.

In examples, the WTRU may receive configuration information from the network (e.g., LMF or gNB), which may include a validity time (e.g., timer) over which the WTRU can report measurements made on PRS to the network. The WTRU may include a time stamp along with the measurements made by the WTRU. The WTRU may refrain from reporting the measurements, for example, if the WTRU reports measurements after the time expiry. The WTRU may be configured with a threshold on the amount of measurements the WTRU can report during on occasion. The WTRU may receive a reporting setting(s) (e.g., multiple reporting settings), for example, where a setting (e.g., each setting) may be associated with a volume threshold (e.g., different volume threshold). If the amount of measurements exceeds the threshold, the WTRU may choose one of the reporting settings which allow the WTRU to report measurements under the volume threshold. The WTRU may refrain from returning measurement reports to the network, for example, if the WTRU cannot find settings with a data volume under the configured thresholds.

The WTRU may (e.g., receive configuration information indicating to) include a time stamp associated with the location measurement instance. The WTRU may include the time stamp, for example, if the report is transmitted on an unlicensed cell.

The WTRU may (e.g., receive configuration information indicating to) bundle or aggregate (e.g., a number) of positioning reports. The WTRU may aggregate positioning reports, for example, until it gains access to the channel. The WTRU may receive configuration information indicating a number (e.g., maximum number) of positioning reports aggregated together, beyond which the WTRU may refrain from sending together aggregated with other reports. The WTRU may receive configuration information indicating a number (e.g., minimum number) of positioning reports, below which the WTRU may refrain from attempting to access the channel or attempt LBT. The WTRU may aggregate positioning reports if (e.g., only if) certain conditions are met, including at least one of the following: the positioning report is not associated with a high priority application or LCH, the WTRU is configured with a certain configuration, the report is transmitted over an unlicensed carrier/cell, the WTRU is not configured with a different cell (e.g., over which reporting is possible and is licensed), etc.

The WTRU may receive configuration information indicating the number of reports to send to the network. The WTRU may receive configuration information indicating a time (e.g., timer) to send the configured number of reports. The WTRU may determine to send an indication to the network that positioning is interrupted or terminated, for example, if the WTRU cannot send the configured number of reports to the network before the time expires (e.g., timer expiry). Depending on the remaining time until the time expires (e.g., timer expiry), the WTRU may (e.g., determine to) bundle reports, for example, as described herein. The WTRU may determine a number of reports to bundle depending on the remaining time until the time expires (e.g., timer expiry). For example, the WTRU may receive configuration information indicating the number (e.g., maximum number) of reports depending on the remaining time. For example, if the remaining time until the time expires (e.g., timer expiry) is less than 1 ms, the WTRU may receive configuration information (e.g., a preconfiguration) to bundle up to 5 reports. If the remaining time is more than 5 ms, the WTRU may receive configuration information (e.g., a preconfiguration) from the network indicating to bundle up to 2 reports, for example.

The WTRU may report the measurement on a different cell, BWP, and/or UL resource (e.g., a different one on a different LBT subband), for example, based on a LBT failure to report a measurement report to LMF. In examples, the WTRU may receive configuration information indicating reporting occasions (e.g., additional or supplemental reporting occasions), over which the WTRU may report positioning reports in the unlicensed spectrum. The WTRU may use supplemental reporting occasions, for example, if (e.g., only if) LBT fails on reporting occasions not included in the supplemental set. The WTRU may receive configuration information indicating certain CGs, BWPs, subbands, or cells associated with one or more supplemental reporting occasion.

PRS configuration information coordination may be provided between a LMF and a base station (e.g., gNB). The WTRU may receive PRS configuration information from the base station (e.g., gNB), for example, based on the unlicensed band usage by the base station (e.g., gNB). The WTRU may receive a set of PRS configuration information from which the base station (e.g., gNB) may choose a PRS configuration based on the unlicensed band configuration information.

The WTRU may receive an association between unlicensed band usage (e.g., bandwidth, DRS window) and PRS configuration information from the network (e.g., LMF, gNB). For example, if the WTRU is configured with 20 MHz of the unlicensed band, the WTRU may receive configuration information (e.g., preconfiguration information) indicating PRS parameters (e.g., number of PRS resources, bandwidth, periodicity, number of symbols, number of repetitions) associated with the 20 MHz bandwidth. Based on receiving the configuration for unlicensed bandwidth, the WTRU may return an index of configuration information to the base station (e.g., gNB) to indicate which PRS configuration the WTRU chose.

If the WTRU receives PRS configuration information from the base station (e.g., gNB), the WTRU may not expect to receive PRS configuration information from the LMF. If the unlicensed positioning is terminated, the WTRU may receive PRS configuration information from the LMF (e.g., via LPP).

The WTRU may receive PRS configuration information from the base station (e.g., gNB), e.g., via RRC signaling, MAC-CE signaling, DCI, or broadcast channels. The WTRU may receive configuration information related to PRS transmitted in DRS windows. The WTRU may receive PRS configuration information along with configurations related to COT or DRS, for example.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU) comprising, a processor configured to:

receive configuration information, wherein the configuration information indicates that the WTRU is to monitor for positioning reference signals (PRSs) in an unlicensed band, and wherein the configuration information indicates a first threshold;

determine that there is a number of consecutive missing PRSs associated with the unlicensed band and that the number of consecutive missing PRSs associated with the unlicensed band is greater than or equal to the first threshold;

based on the determination that the number of consecutive missing PRSs associated with the unlicensed band is greater than or equal to the first threshold, perform a first measurement associated with a first set of PRSs, wherein the first set of PRSs comprises a first PRS scheduled for transmission in a DRS window, and wherein the first PRS is determined to be present in the DRS window; and send a measurement report comprising at least one of the first measurement or a first indication that indicates the first set of PRSs.

2. The WTRU of claim 1, wherein the processor is further configured to:

determine that a second PRS from a set of consecutive missing PRSs is missing in the unlicensed band based on one or more of a determination that a measurement associated with the second PRS is below a second threshold, a channel occupancy time (COT) indication, or a second DCI.

3. The WTRU of claim 1, wherein the processor is configured to:

detect a signal, wherein the signal indicates a start time associated with the DRS window.

4. The WTRU of claim 3, wherein the processor is configured to:

determine a duration associated with the DRS window based on the start time associated with the DRS window.

5. The WTRU of claim 1, wherein the processor is configured to:

perform a second measurement, wherein the second measurement is a measurement associated with a second set of PRSs in the unlicensed band outside the DRS window, and wherein the measurement report comprises at least one of the second measurement or a second indication that indicates the second set of PRSs.

6. The WTRU of claim 1, wherein the processor is configured to:

determine that a number of PRSs associated with the DRS window is below a third threshold; and based on the determination that the number of PRSs associated with the DRS window is below the third threshold, perform a second measurement on a PRS associated with a licensed band.

7. The WTRU of claim 1, wherein the processor is configured to:

determine that a number of PRSs associated with the DRS window is below a third threshold; and based on the determination that the number of PRSs associated with the DRS window is below the third threshold, perform a second measurement on a PRS associated with a global navigation satellite system spectrum.

8. The WTRU of claim 1, wherein the first PRS is determined to be present in the DRS window based on one or more of: first downlink control information (DCI) received in the DRS window that indicates that the first PRS is present in the DRS window, a start time associated with the DRS window, or a duration associated with the DRS window.

9. A method, the method comprising, receiving configuration information, wherein the configuration information indicates to monitor for positioning reference signals (PRSs) in an unlicensed band, and wherein the configuration information indicates a first threshold;

determining that there is a number of consecutive missing PRSs associated with the unlicensed band and that the number of consecutive missing PRSs associated with the unlicensed band is greater than or equal to the first threshold;

based on the determination that the number of consecutive missing PRSs associated with the unlicensed band is greater than or equal to the first threshold, performing a first measurement associated with a first set of PRSs, wherein the first set of PRSs comprises a first PRS scheduled for transmission in a DRS window, and wherein the first PRS is determined to be present in the DRS window; and sending a measurement report comprising at least one of the first measurement or a first indication that indicates the first set of PRSs.

10. The method of claim 9, wherein the method further comprises:

determining that a second PRS from a set of consecutive missing PRSs is missing in the unlicensed band based on one or more of a determination that a measurement associated with the second PRS is below a second threshold, a channel occupancy time (COT) indication, or a second DCI.

11. The method of claim 9, wherein the method further comprises:

detecting a signal, wherein the signal indicates a start time associated with the DRS window.

12. The method of claim 11, wherein the method further comprises:

determining a duration associated with the DRS window based on the start time associated with the DRS window.

13. The method of claim 9, wherein the method further comprises:

performing a second measurement, wherein the second measurement is a measurement associated with a second set of PRSs in the unlicensed band outside the DRS window, and wherein the measurement report comprises at least one of the second measurement or a second indication that indicates the second set of PRSs.

14. The method of claim 9, wherein the method further comprises:

determining that a number of PRSs associated with the DRS window is below a third threshold; and based on the determination that the number of PRSs associated with the DRS window is below the third threshold, performing a second measurement on a PRS associated with a licensed band.

15. The method of claim 9, wherein the method further comprises:

determining that a number of PRSs associated with the DRS window is below a third threshold; and based on the determination that the number of PRSs associated with the DRS window is below the third threshold, performing a second measurement on a PRS associated with a global navigation satellite system spectrum.

16. The method of claim 9, wherein the first PRS is determined to be present in the DRS window based on one or more of: first downlink control information (DCI) received in the DRS window that indicates that the first PRS is present in the DRS window, a start time associated with the DRS window, or a duration associated with the DRS window.

* * * * *